(12) United States Patent
Mandal et al.

(10) Patent No.: US 11,693,916 B2
(45) Date of Patent: Jul. 4, 2023

(54) SOLVING QUADRATIC INTEGER PROGRAMMING (QIP) PROBLEMS ON OPTIMIZATION SOLVER MACHINES

(71) Applicant: FUJITSU LIMITED, Kawasaki (JP)

(72) Inventors: Avradip Mandal, San Jose, CA (US); Arnab Roy, Santa Clara, CA (US); Sarvagya Upadhyay, San Jose, CA (US); Hayato Ushijima-Mwesigwa, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 385 days.

(21) Appl. No.: 16/947,594

(22) Filed: Aug. 7, 2020

(65) Prior Publication Data
US 2022/0043882 A1 Feb. 10, 2022

(51) Int. Cl.
*G06F 17/11* (2006.01)
*G06F 17/16* (2006.01)
*G06Q 40/06* (2012.01)

(52) U.S. Cl.
CPC .............. *G06F 17/11* (2013.01); *G06F 17/16* (2013.01); *G06Q 40/06* (2013.01)

(58) Field of Classification Search
CPC ......... G06F 17/11; G06F 17/16; G06Q 40/06; G06N 7/005; G06N 10/00; G06N 5/003
USPC ...................................................... 708/446
See application file for complete search history.

(56) References Cited

FOREIGN PATENT DOCUMENTS

WO WO-2021072221 A1 * 4/2021 .............. G06F 17/11

OTHER PUBLICATIONS

Nocedal, Jorge; Wright, Stephen J. (2006). Numerical Optimization (2nd ed.). Berlin, New York: Springer-Verlag: 439-486.
Kozlov, M. K.; S. P. S.P.; Khachiyan, L.G. (1979). Polynomial solvability of convex quadratic programming. Dokaldi Akademii Nauk SSSR. 248: 1049-1051. Translated: Soviet Mathematics—Doklady. 20: 1108-1111.
Pardalos, Panos M.; Vavasis, Stephen A. (1991). Quadratic programming with one negative eigenvalue is (strongly) NP-hard. Journal of Global Optimization. 1 (1): 15-22.
(Continued)

*Primary Examiner* — Tan V Mai
(74) *Attorney, Agent, or Firm* — Fujitsu Patent Center

(57) ABSTRACT

According to an aspect of an embodiment, operations include receiving a Quadratic Integer Programming (QIP) problem including an objective function and a set of constraints on integer variables associated with the objective function. The operations further include obtaining an approximation of the QIP problem by relaxing the QIP problem and generating an approximate solution by solving the obtained approximation. The operations further include generating a Quadratic Unconstrained Binary Optimization (QUBO) formulation of the QIP problem based on the generated approximate solution and the received QIP problem. The operations further include submitting the generated QUBO formulation to an optimization solver machine and receiving a solution of the submitted QUBO formulation from the optimization solver machine. The operations further include publishing an integral solution of the received QIP problem on a user device based on the received solution.

16 Claims, 7 Drawing Sheets

(56) References Cited

OTHER PUBLICATIONS

Markowitz, Harry M. (1959). Portfolio Selection: Efficient Diversification of Investments. New York: John Wiley & Sons. (reprinted by Yale University Press, 1970; 2nd ed. Basil Blackwell, 1991).
C. Buchheim, A. Wiegele: "Semidefinite relaxations for non-convex quadratic mixed-integer programming" Mathematical Programming, vol. 141, No. 1-2, Mar. 30, 2012, pp. 435-452, XP055831281, DOI: 10.1007/s 10107-012-0534-y.
L. Galli, A. N. Letchford: "Valid inequalities for a family of non-convex quadratic optimization problems", Optimization Online, Jun. 2020 (Jun. 2020), XP055831338, Retrieved from the Internet: URL: http://www.optimization-online.org/DB_FILE/2020/06/7845.pdf [retrieved on Aug. 10, 2021], 18 pages.
S. Dash: "A note on QUBO instances defined on Chimera graphs", arXiv:1306.1202v2, Jul. 1, 2013 (Jul. 1, 2013) XP055399931, Retrieved from the Internet: URL: https://arxiv.org/abs/1306.1202v2 [retrieved on Feb. 21, 2017], 8 pages.
Extended European Search Report (EESR) mailed in connection with European Patent Application No. 21161490.4-1203, dated Aug. 24, 2021, corresponding to U.S. Appl. No. 16/947,594, 6 pages.

\* cited by examiner

SOLVING QUADRATIC INTEGER PROGRAMMING (QIP) PROBLEMS ON OPTIMIZATION SOLVER MACHINES

FIELD

The embodiments discussed in the present disclosure are related to solving quadratic integer programming problems on optimization solver machines.

BACKGROUND

Many of the real-world problems can be treated as a QIP problem. Many real-world problems in various industries involve decisions as discrete choices which fall into the scope of a QIP problem. For example, a real-world problem of portfolio allocation for an investor portfolio may be considered as a QIP problem, in which it may be required to identify a set-number of assets to be bought or sold for each asset type in the investor portfolio. Any particular QIP problem will usually have a specific set of optimal solutions which may have to be searched from a discrete solution space of integer numbers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the disclosure, operations may include receiving a Quadratic Integer Programming (QIP) problem including an objective function and a set of constraints on integer variables associated with the objective function. The operations may further include obtaining an approximation of the QIP problem by relaxing the QIP problem and generating an approximate solution by solving the obtained approximation. The operations may further include generating a Quadratic Unconstrained Binary Optimization (QUBO) formulation of the QIP problem based on the generated approximate solution and the received QIP problem and submitting the generated QUBO formulation to an optimization solver machine. The operations may further include receiving a solution of the submitted QUBO formulation from the optimization solver machine and publishing an integral solution of the received QIP problem on a user device based on the received solution.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
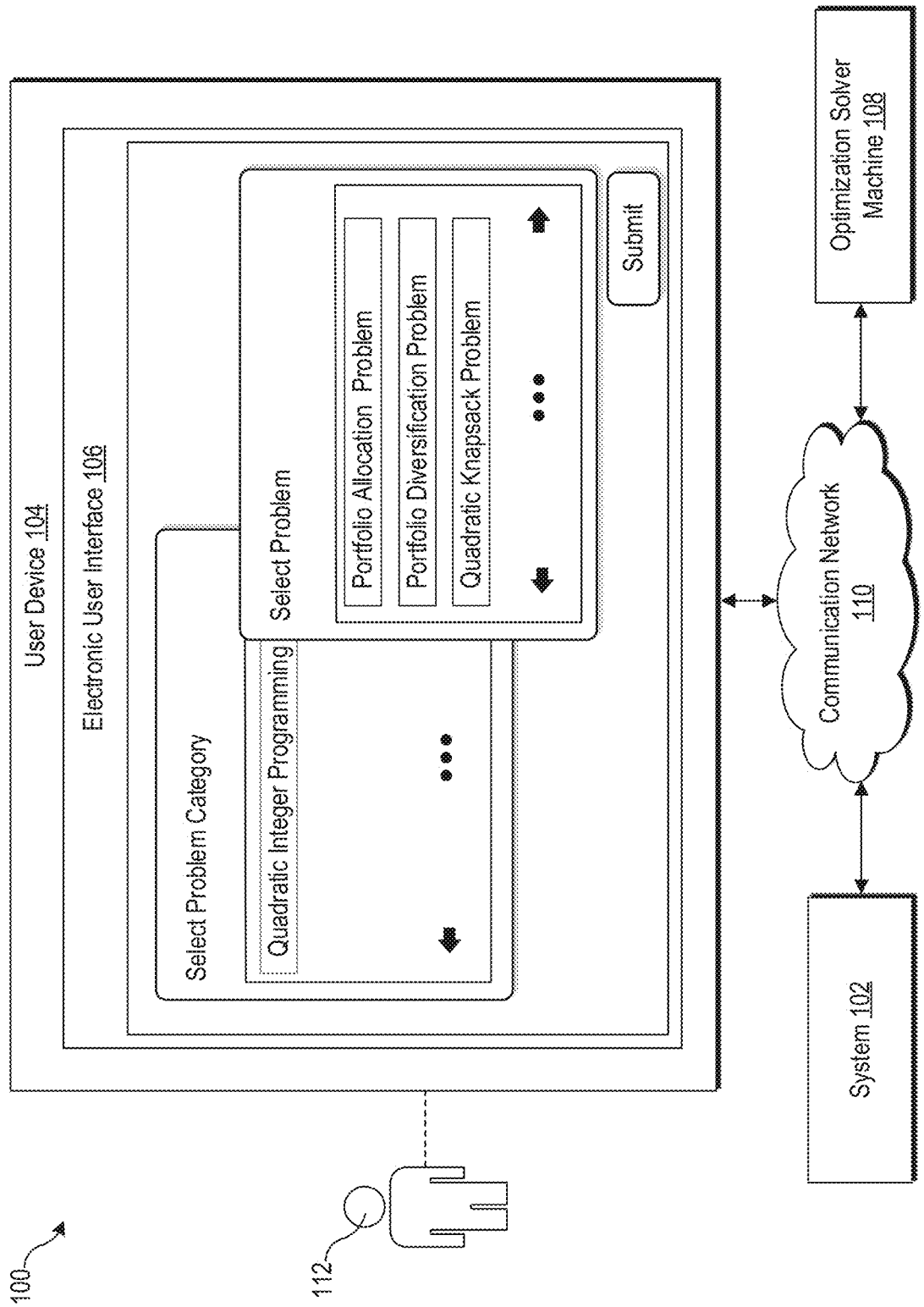
FIG. 1 is a diagram representing an exemplary network environment for solving quadratic integer programming problems on optimization solver machines.

Embodiments of the present disclosure are explained with reference to the accompanying drawings.

Some embodiments described in the present disclosure relate to methods and systems for solving quadratic integer programming (QIP) problems on optimization solver machines. Many of the real-world problems can be treated as a QIP problem. Many real-world problems in various industries involve decisions as discrete choices which may fall into the scope of a QIP problem. For example, a real world problem of portfolio allocation for an investor may be considered as a QIP problem, in which it may be required to identify a set-number of assets to be bought or sold for each asset type in the investor portfolio such that an investment risk associated with the investor portfolio is a minimum. Any particular QIP problem will usually have a specific set of optimal solutions which may have to be searched from a discrete solution space of integer numbers.

Typically, a QIP problem can be mathematically formulated as follows:

minimize: $x^T Q x + c^T x$

Subject to: $Ax \geq b$ $x \in Z$

Where,

Q represents a symmetric cost matrix ($Q \in R^{n \times n}$),
A represents a constant matrix ($A \in R^{m \times n}$),
c represents a cost vector ($c \in R^n$),
b represents a constraint vector ($b \in R^m$), and
x represents an unknown integer vector.

QIP problems may be considered as non-deterministic polynomial-time (NP) hard. Therefore, it may be computationally intractable for conventional computers to produce an optimal or near optimal solution of a QIP problem in a short span of time/tractable amount of time. In order to find an optimal or near optimal solution of the QIP problem in a tractable amount of time, optimization solver machines, such as Ising Processing Units (IPUs) may be utilized. To solve the QIP problem on the optimization solver machines, the QIP problem may be required to be formulated as Quadratic Unconstrained Binary Optimization (QUBO) formulation or an Ising formulation. To obtain the QUBO formulation or the Ising formulation, the unknown integer vector (x) may have to be represented as a vector with Boolean variables. It is not straightforward to convert unknown integer vector (x) into a Boolean vector. Moreover, the relationship $x^2=x$ is only true for Boolean variables. Higher order integer programs cannot be converted into quadratic programs as in the case of Boolean variables. When the QIP problem includes inequality constraints, then it is difficult to handle such inequality constraints even over Boolean variables. Integer variables do not give a straightforward bound on slack variables.

In order to solve the QIP problem, the QIP problem may be relaxed to obtain an approximation of the QIP problem. For such relaxation, the integer variables ($x \in Z$) associated with the objective function of the QIP problem may be replaced by real variables ($x \in R$). The obtained approximation may be solved to generate an approximation solution. Conventional solvers, including commercial solvers and open source software solvers, such as Cplex, MATLAB®, Mathematica R®, NAG numerical library or Gurobi® may be used to solve the obtained approximation to generate an approximate solution of a relaxed form of the QIP problem.

The disclosed system may generate a Quadratic Unconstrained Binary Optimization (QUBO) formulation of the received QIP problem based on the generated approximate solution. The disclosed system provides two different approaches to generate the QUBO formulation of the QIP problem.

In the first approach, the disclosed system may substitute each integer variable of the unknown integer vector (x) of the QIP problem with a substitution term. For each integer variable, the substitution term may be obtained based on approximate solution of the relaxed form of the QIP problem. The disclosed system may reformulate the QIP problem based on the substitution to generate the QUBO formulation of the QIP problem. The QUBO formulation of the QIP problem may be solved by using the optimization solver machine to generate an optimal or near-optimal integral solution of the QIP problem.

The first approach may produce the integral solution quickly in a tractable amount of time but may not perform well in certain scenarios, such as when the number of constraints associated with the objective function of the QIP problem are greater than a threshold number (say 3). Moreover, the first approach may have few caveats, such as the relaxed version of the QIP problem may be stuck in local optima, or the constraints may not be satisfied for the Boolean variables, or the solution obtained after solving the QUBO formulation may be far from optimal solution even if constraints are satisfied.

To overcome the caveats of the first approach, the disclosed system may use a second approach for solving the QIP problem on the optimization solver machine. In the second approach, the integral range of the generated approximation solution may be increased. As a result, each integer variable ($x_i$) may require many representative Boolean variables as compared to that in the first approach. Such an approach may require more time as compared to the first approach but may provide optimal (or near optimal) solution almost every time. Using the aforementioned approaches, it may be possible to formulate and solve the QIP problem on a QUBO solver or IPUs in a tractable amount of time as compared to time taken by the conventional approaches known in the art.

FIG. 1 is a diagram representing an exemplary network environment for solving quadratic integer programming problems on optimization solver machines, arranged in accordance with at least one embodiment described in the present disclosure. With reference to FIG. 1, there is shown a network environment 100. The network environment 100 includes a system 102, a user device 104, an electronic User Interface (UI) 106 of the user device 104, and an optimization solver machine 108. The system 102, the user device 104, and the optimization solver machine 108 may be communicatively coupled to each other, via a communication network 110. There is further shown a user 112 who may be associated with the user device 104.

The system 102 may be a part of an on-premise computing environment associated with the user 112. The system 102 may include suitable logic, circuitry, and interfaces that may be configured to display a set of user-selectable templates onto the electronic UI 106 of the user device 104. Each of such templates may be used to configure a Quadratic Integer Programming (QIP) problem for a specific application area. The QIP problem may model a real-world problem and may be mathematically formulated to include an objective function and a set of constraints on integer variables associated with the objective function.

In one or more embodiments, the system 102 may include the user device 104 as part of the on-premise computing environment. The user device 104 may include a suitable network interface to communicate with the optimization solver machine 108 that may be on premise or may be hosted on a cloud system. Examples of the user device 104 may include, but are not limited to, a mobile device, a desktop computer, a laptop, a computer workstation, or a server, such as a cloud server.

The electronic UI 106 may be displayed on the user device 104 to allow the user 112 to select and configure a QIP problem, such as, but not limited to, a portfolio allocation problem, a portfolio diversification problem, a quadratic knapsack problem, a power generation optimization problem, a design optimization problem, a crop selection problem, a demand-supply response problem, or an enterprise selection problem.

In an embodiment, the system 102 may receive an input to select, from the displayed set of user-selectable templates, a first user-selectable template associated with a QIP problem. For example, a user-selectable template may be selected from a dropdown menu which lists one or more template names of the QIP problems. When a template name is selected from the dropdown menu, the electronic UI 106 may display a composition page where the user 112 may be allowed to provide inputs and customize parameters and constraints of the selected QIP problem.

The system 102 may determine an objective function associated with the QIP problem. The objective function may be a mathematical formulation of the QIP problem and may be subjected to a set of constraints over integer variables associated with the objective function. Such constraints may vary for every type of problem. For example, in defining a risk-versus-return portfolio allocation problem for an investor portfolio, an inequality constraint may be additionally defined to model transaction costs and portfolio diversification.

In one or more embodiments, the electronic UI 106 may include an edit window, which the user 112 may use to customize the problem formulation by modifying the objective function and/or the set of constraints over the integer variables. Using the edit window, the user 112 may be able to input a revised objective function and/or a constraint of the QIP problem. In these or other embodiments, the electronic UI 106 may allow the user 112 to provide a set of datapoints as input for the QIP problem. For example, in case of a portfolio allocation problem, the set of datapoints may include a time-series price data of each asset or a current allocation of wealth for different assets in an investor portfolio. Depending on the user 112, the set of datapoints may be manually entered in a text box field of the electronic UI 106 or may be uploaded through a database or data file(s).

The system 102 may obtain an approximation of the QIP problem by relaxing the QIP problem. The approximation (also referred as a relaxed problem) may be obtained by replacing the integer variables with real variables. The approximation of the QIP problem is described in detail, for example, in FIG. 3. After relaxation, the system 102 may solve the obtained approximation to generate an approximate solution. In some embodiments, the system 102 may utilize conventional solvers, such as Cplex, MATLAB, Mathematica, NAG numerical library or Gurobi to generate the approximate solution of the obtained approximation. The approximate solution may include a vector of real values that may correspond to an unknown vector of variables (real variables) in the obtained approximation of the QIP problem. From, the approximate solution, it may be possible to determine an integral range for each of the integer variables of the QIP problem. Additionally, the approximate solution may be used to formulate the QIP problem in QUBO form, as described herein.

The system 102 may generate a QUBO formulation of the QIP problem based on the received QIP problem (includes the objective function and the set of constraints on the integer variables) and the generated approximate solution. The QUBO formulation may be a compatible input format for the optimization solver machine 108 and may include a square matrix (Q a positive definite matrix) of constants. The value of the square matrix (Q) may depend on the objective function, the set of constraints, and a vector of Boolean variables as encodings or representative variables of the integer variables associated with the objective function of the QIP problem. In some embodiments, the QUBO formulation may also consider penalty terms and slack variables if there one or more inequality constraints in the set of constraints of the received QIP problem. Such terms and variables may be considered while generating the QUBO formulation. The generation of the QUBO formulation is described in detail, for example, in FIG. 3 and FIG. 4.

The generated QUBO formulation may be submitted via one or more application programming interface (API) calls to the optimization solver machine 108. These API calls may be used to deliver a request from the system 102 to the optimization solver machine 108 and then relay a response to the request back from the optimization solver machine 108 to the system 102. The optimization solver machine 108 may receive the QUBO formulation and may compute a solution of the QUBO formulation by using optimization solving methods, such as quantum annealing or simulated annealing.

In one or more embodiments, the optimization solver machine 108 may be implemented as a generalized quantum computing device on a cloud-based optimization system. The cloud-based optimization system may be implemented as one of a private cloud, a public cloud, or a hybrid cloud. In such an implementation, the generalized quantum computing device may use specialized optimization solving software applications (e.g., a QUBO or an Ising solver) at an application layer to implement searching algorithms or meta-heuristic algorithms, such as simulated annealing or quantum annealing, to search for the solution of the QUBO formulation from a discrete solution space of Boolean values (0 or 1).

The generalized quantum computing device may be different from a digital bit-based computing device, such as digital devices that are based on transistor-based digital circuits. The generalized quantum computing device may include one or more quantum gates that use quantum bits (hereinafter referred to as "qubits") to perform computations for different information processing applications, such as quantum annealing computations for solving the QIP problem (i.e. the QUBO formulation of the QIP problem). In general, a qubit can represent "0", "1", or a superposition of both "0" and "1". In most cases, the generalized quantum computing device may need a carefully controlled cryogenic environment to function properly. The generalized quantum computing device uses certain properties found in quantum mechanical systems, such as quantum fluctuations, quantum superposition of its Eigenstates, quantum tunneling, and quantum entanglement. These properties may help the generalized quantum computing device to perform computations for solving certain mathematical problems (e.g. QUBO) which are computationally intractable by conventional computing devices. Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, and nuclear magnetic resonance quantum computer.

In some other embodiments, the optimization solver machine 108 may be a quantum annealing computer that may be specifically designed and hardware/software optimized to implement searching algorithms or meta-heuristic algorithms, such as simulated annealing or quantum annealing. Similar to the generalized quantum computing device, the quantum annealing computer may also use qubits and may require a carefully controlled cryogenic environment to function properly.

In some other embodiments, the optimization solver machine 108 may correspond to a digital quantum-computing processor for solving user-end QIP problems, which may be submitted in the form of the QUBO formulation or an Ising formulation (e.g., after a conversion from QUBO to Ising). More specifically, the optimization solver machine 108 may be a digital annealer that may be based on a semiconductor-based architecture. The digital annealer may be designed to model the functionality of the quantum annealing computer on a digital circuitry. The digital annealer may operate at room temperature and may not require cryogenic environment to function. Also, the digital annealer may have a specific form factor that may allow it to fit on a circuit board that may be small enough to slide into the rack of a computing device or a computing infrastructure, such as a data center. In an embodiment, the digital annealer may include, for example, Ising Processing Units, to solve the Ising formulation of the QIP problem. The Ising formulation may be obtained after conversion of the generated QUBO formulation. Method to perform such a conversion are well known in the art and therefore, details of such methods are omitted from the disclosure for the sake of brevity.

In some other embodiments, the optimization solver machine 108 may include a processor to execute software instructions associated with one or more searching algorithms and/or meta-heuristic algorithms, such as simulated annealing or quantum annealing. Examples of the implementation of the processor may include, but are not limited to, a Reduced Instruction Set Computing (RISC) processor, an Application-Specific Integrated Circuit (ASIC) processor, a Complex Instruction Set Computing (CISC) processor, a Graphical Processing Unit (GPU), a Co-processor, and/or a combination thereof.

The optimization solver machine 108 may transmit the computed solution of submitted QUBO formulation to the system 102. The system 102 may receive the solution from the optimization solver machine 108. An integral solution of the QIP problem may be determined based on the received solution. The determination of the integral solution of the received QIP problem is described in detail, for example, in FIG. 3, and FIG. 4. By way of example and not limitation, if the QIP problem is a risk-averse portfolio allocation problem for an investor portfolio holding a number of assets. The integral solution of the portfolio allocation problem may include a set-number of assets to be bought or sold for each asset type in the investor portfolio such that an investment risk associated with the investor portfolio is a minimum.

The system 102 may publish the integral solution of the QIP problem on the user device 104. For example, the integral solution may be displayed on the electronic UI 106 of the user device 104 or may be committed as an update to a database on the user device 104.

It should be noted that the communication among the system 102, the user device 104, and the optimization solver machine 108 may be performed via the communication network 110. The communication network 110 may include a communication medium through which the system 102 may communicate with the optimization solver machine 108, and different servers (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN).

Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Figure 2:
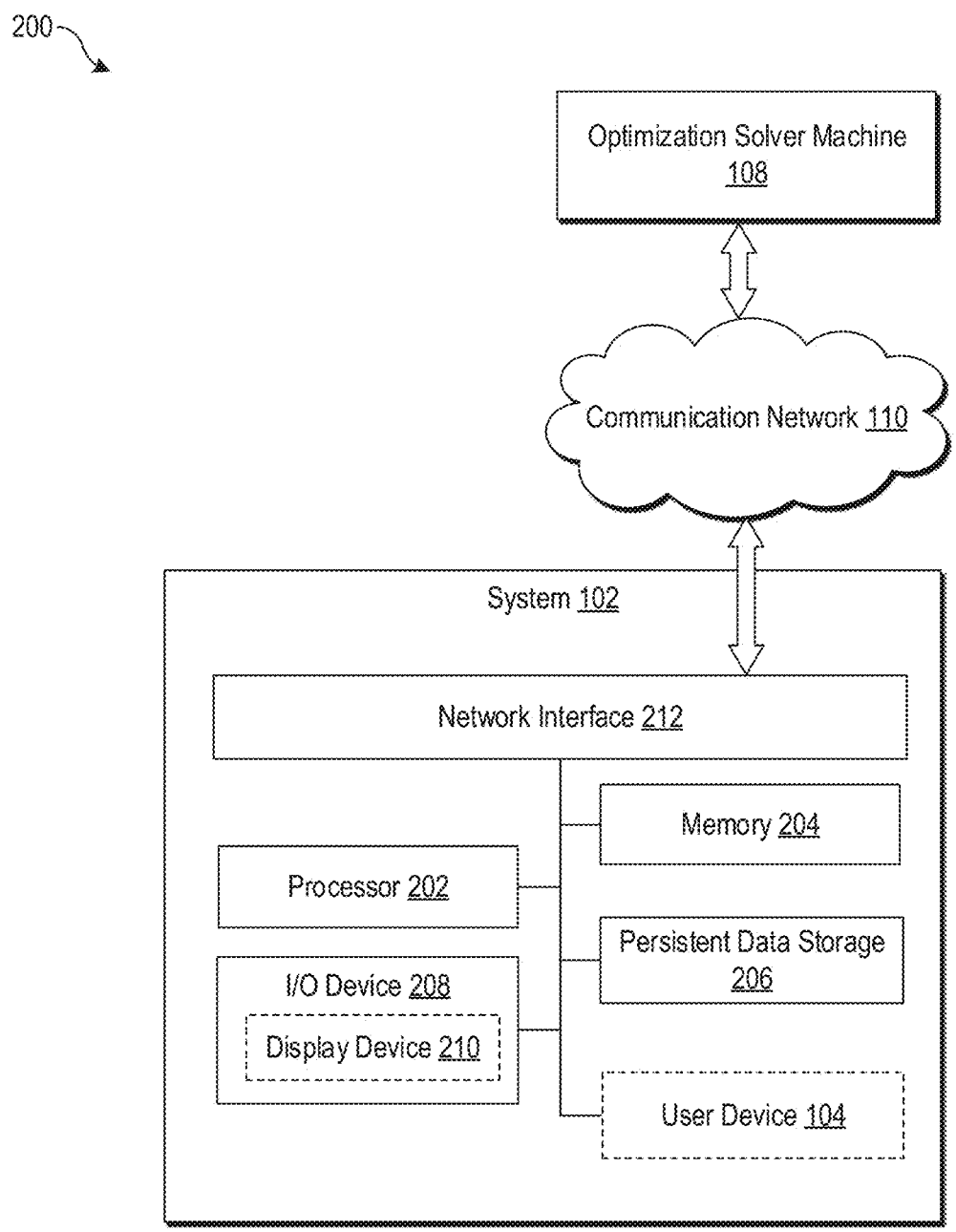
FIG. 2 is a block diagram of a system for solving quadratic integer programming problems on optimization solver machines.

FIG. 2 is a block diagram of a system for solving quadratic integer programming problems on optimization solver machines, according to at least one embodiment of the disclosure. FIG. 2 is explained in conjunction with elements from FIG. 1. With reference to FIG. 2, there is shown a block diagram 200 of the system 102. The system 102 may include a processor 202, a memory 204, and a persistent data storage 206. In some embodiments, the system 102 may also include an input/output (I/O) device 208 that may include a display device 210, and a network interface 212. The user device 104 may or may not be a part of the system 102.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, and/or interfaces that may be configured to store program instructions executable by the processor 202. In certain embodiments, the memory 204 may be configured to store information, such as the objective function and a set of constraints associated with each of the set of QIP problem(s) of FIG. 1. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive the first input corresponding to selection of the QIP problem and the set of datapoints of the QIP problem. The I/O device 208 may be further configured to publish the integral solution of the QIP problem on the display device 210. The I/O device 208 may include various input and output devices, which may be configured to communicate with the processor 202 and other components, such as the network interface 212. Examples of the input devices may include, but are not limited to, a touch screen, a keyboard, a mouse, a joystick, and/or a microphone. Examples of the output devices may include, but are not limited to, a display (such as the display device 210) and a speaker.

The display device 210 may include suitable logic, circuitry, interfaces, and/or code that may be configured to render the electronic user interface (UI) 106 onto a display screen of the display device 210. In one or more embodiments, multiple user inputs from a user (such as the user 112) may be received directly, via the display device 210. In such cases, the display screen of the display device 210 may be a touch screen to receive the multiple user inputs. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. Additionally, in some embodiments, the display device 210 may refer to a display screen of smart-glass device, a 3D display, a see-through display, a projection-based display, an electrochromic display, and/or a transparent display.

The network interface 212 may include suitable logic, circuitry, interfaces, and/or code that may be configured to establish a communication between the system 102, the user device 104, and the optimization solver machine 108, via the communication network 110. The network interface 212 may be implemented by use of various known technologies to support wired or wireless communication of the system 102 via the communication network 110. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 102 without departing from the scope of the present disclosure. For example, in some embodiments, the system 102 may include any number of other components that may not be explicitly illustrated or described.

Figure 3:
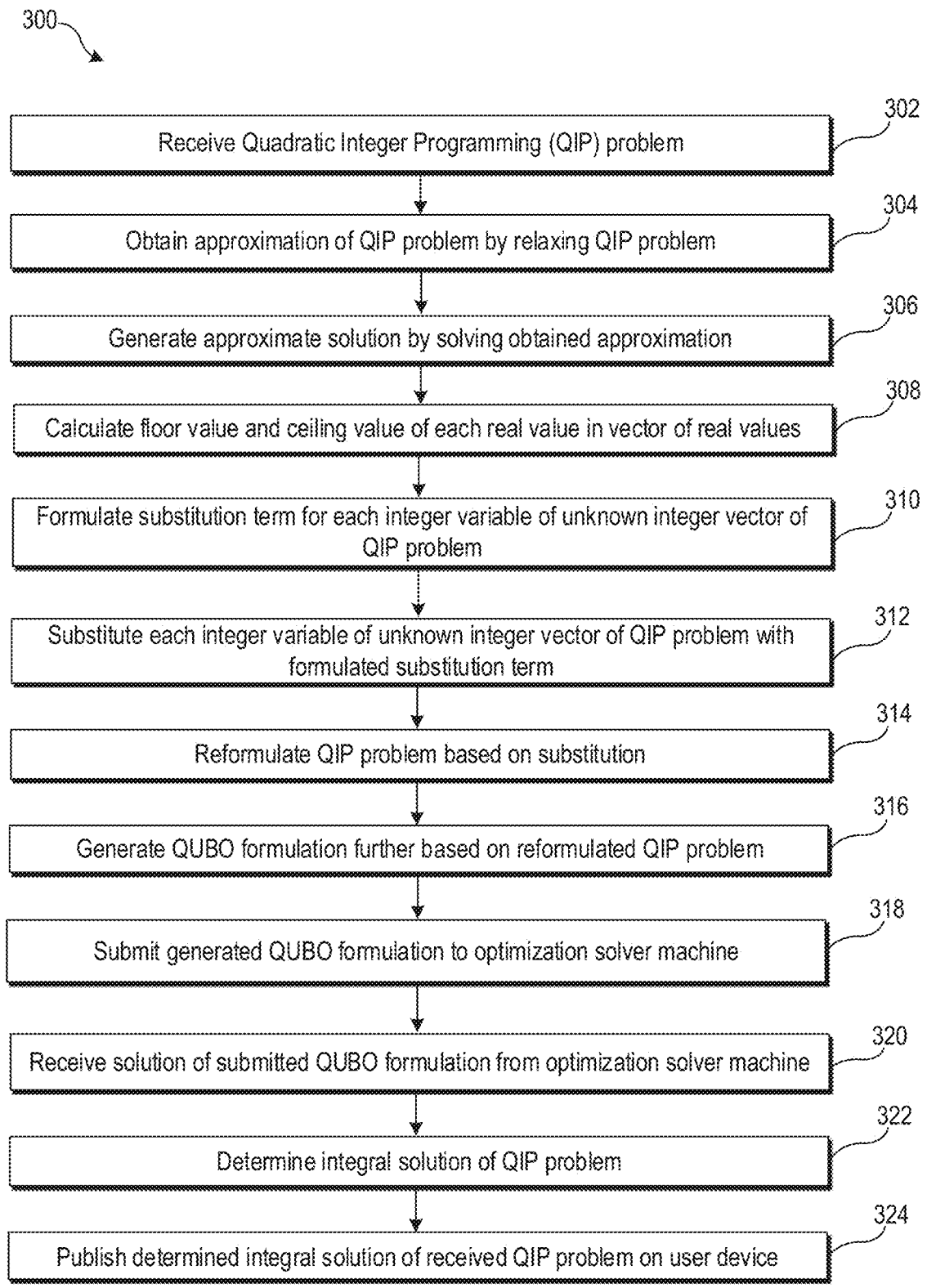
FIG. 3 is a flowchart of a first method for solving quadratic integer programming problems on optimization solver machines.

FIG. 3 is a flowchart of a first method for solving quadratic integer programming problems on optimization solver machines, arranged in accordance with at least one embodiment described in the present disclosure. FIG. 3 is explained in conjunction with elements from FIG. 1 and FIG. 2. With reference to FIG. 3, there is shown a flowchart 300. The first method illustrated in the flowchart 300 may start at 302 and may be performed by any suitable system, apparatus, or device, such as by the system 102 of FIG. 2.

At 302, a Quadratic Integer Programming (QIP) problem may be received. The received QIP problem may include an objective function and a set of constraints on integer variables associated with the objective function. The objective function may be a quadratic function of integer variables, with linear constraints on the integer variables. Such constraints may include a linear equality and/or linear inequality constraint.

In an embodiment, the QIP problem may be selected from a set of QIP problems on the electronic UI 106 of the user device 104. In such a scenario, the system 102 may determine the objective function and the set of constraints based on the selection of the QIP problem via the electronic UI 106. By way of example, and not limitation, the objective function of the QIP problem is given by equation (1), as follows:

$$\min_{x} x^T Q x + c^T x \qquad (1)$$

Where,
Q may represent a symmetric cost matrix and $Q \in R^{n \times n}$,
x may represent an unknown integer vector of variables and $x = \{x_1, x_2, x_3, \ldots, x_n\}$, and
c may represent a cost vector and $c \in R^n$.
The objective function of equation (1) may be subjected to an inequality constraint (i.e. a constraint function), which is given by equation (2), as follows:

$$Ax \geq b$$
$$x \in Z^n \qquad (2)$$

where,
A may represent a constraint matrix and $A \in R^{m \times n}$, and
b may represent a constraint vector and $b \in R^m$.

From equation (1) and equation (2), it may be determined that the unknown integer vector (x) may span over integers (Z). The objective function of equation (1) may have to be minimized over the unknown integer vector of variables (x) to obtain an optimal or near-optimal solution of the QIP problem.

At 304, an approximation of the QIP problem may be obtained by relaxing the QIP problem. The relaxation of the QIP problem may include conversion of the received QIP problem (at 302) into a relaxed problem (also referred as an approximation of the QIP problem). Specifically, the relaxation may include replacement of the integer variables (x, x∈Z$^n$) with real variables (x̃, x̃∈R$^n$). By way of example, and not limitation, the approximation of the QIP problem of equation (1) and equation (2) is provided by equations (3) and (4), as follows:

$$\min_x \tilde{x}^T Q \tilde{x} + c^T \tilde{x} \quad (3)$$

Where,
Q may represent a symmetric cost matrix and Q∈R$^{n \times n}$,
x may represent an unknown vector of variables and x={x$_1$, x$_2$, x$_3$, ..., x$_n$}, and
c may represent a cost vector and c∈R$^n$.
The objective function of equation (3) may be subjected to an inequality constraint (i.e. a constraint function), which is given by equation (4), as follows:

$$Ax \geq b$$
$$x \in R^n \quad (4)$$

where,
A may represent a constraint matrix and A∈R$^{m \times n}$, and
b may represent a constraint vector and b∈R$^m$.
The QIP problem of equations (1) and (2) may be relaxed by replacing the unknown integral vector (x∈Z$^n$) of equation (2) with the unknown vector of variables (x∈R$^n$).

At 306, an approximate solution of the obtained approximation (at 304) may be generated. The approximate solution of the obtained approximation may be generated by solving the obtained approximation. After relaxation, the obtained approximation (or the relaxed problem) may be solved within a polynomial time using suitable software or hardware optimization solvers. The approximate solution may include a vector of real values (x̃) corresponding to the unknown vector of variables (x∈R$^n$) in the obtained approximation of the QIP problem. The vector of real values (x̃) may be an optimal or near-optimal solution of the obtained approximation (as represented by equations (3) and (4)).

The approximate solution of the relaxed problem may help to determine, for each integer variable of the unknown integer vector (x, x∈Z$^n$), an integral range within which the value of the respective integer variable may lie. By way of example and not limitation, if a real value of a variable (x̃$_1$) is 3.4, then the integer value of a corresponding integer variable (x$_i$) may be one of 3 (⌊3.4⌋) or 4 (⌈3.4⌉).

At 308, a ceiling value and a floor value of each real value in the vector of real values (x̃) may be calculated. The ceiling value may be obtained after application of a ceiling function on a respective real value in the vector of real values (x̃). Similarly, the floor value may be obtained after application of a floor function on the respective real value in the vector of real values (x̃). Herein, the ceiling function and the floor function may be referred to as the Least Integer Function and Greatest Integer Function, respectively. By way of example, and not limitation, the ceiling value of a real value 3.4 may be 4 and the floor value of the real value 3.4 may be 3. In one or more embodiments, the processor 202 may be configured to calculate the floor value and the ceiling value of each real value in the vector of real values.

At 310, a substitution term for each integer variable (say x$_i$) of the unknown integer vector (x) of the QIP problem may be formulated. The substitution term for each integer variable (x$_i$) may be formulated based on the calculated floor value and the calculated ceiling value of a respective real value in the vector of real values (x̃) (included in the approximate solution of the obtained approximation). The substitution term for each integer variable may include one or more Boolean variables (of a vector of Boolean variables) as representative variables of the respective integer variable. By way of example, and not limitation, the substitution term for an i$^{th}$ integer variable (x$_i$) of the unknown integer vector (x) of the equation (1) is given by equation (5), as follows:

$$x_i = (1-a_i)\lfloor \tilde{x}_1 \rfloor + a_i \lceil \tilde{x}_1 \rceil \quad (5)$$

where,
a$_i$ may represent a Boolean variable and a$_i$∈{0,1} or {−1,1} and i∈{1, 2, 3 ... n}.

At 312, each integer variable (x$_i$) of the unknown integer vector (x) of the QIP problem may be substituted with the formulated substitution term (at 310).

At 314, the QIP problem may be reformulated. The reformulation of the QIP problem may correspond to the reformulation of the objective function of the QIP problem and the set of constraints on the integer variables (i.e. the vector of integer variables) associated with the objective function. The reformulation may be based on the substitution of each integer variable (x$_i$) with the corresponding substitution term (as provided in equation (5), for example). The reformulated QIP problem may represent the unknown integer vector (x) through a vector of Boolean variables (a).

At 316, the QUBO formulation may be generated. The QUBO formulation may be generated based on the reformulated QIP problem. The QUBO formulation may be a compatible input format for the optimization solver machine 108 and may include a cost matrix (Q) of constants associated with the vector of Boolean variables (a). For example, equation (6) provides an objective function in a QUBO form.

$$\min(y = a^T \cdot Q \cdot a) \quad (6)$$

where,
a may represent the vector of Boolean variables (as also shown in equation (5), and and Q may be the cost matrix of constants. The matrix (Q) may be the cost matrix of constants (which may be positive definite for QIP) and may be submitted to the optimization solver machine 108.

At 318, the generated QUBO formulation may be submitted to the optimization solver machine 108 via an API call to the optimization solver machine 108. In an embodiment, the optimization solver machine 108 may solve the QUBO formulation by application of searching methods and/or meta-heuristic methods, such as quantum annealing, to obtain a solution of the submitted QUBO formulation. Specifically, to search for the solution (i.e. values of the vector of binary decision variables (a)), the energy of the QUBO formulation may be minimized. The solution may be optimal (or near optimal) and may be searched from a discrete solution space. In another embodiment, the QUBO formulation (at 316) may be converted to an Ising formulation. In such a case, the Ising formulation may be submitted via the API call to the optimization solver machine 108.

At 320, the solution of the submitted QUBO formulation may be received from the optimization solver machine 108. The received solution may include a vector of binary values corresponding to the vector of binary decision variables (a) associated with the QUBO formulation. In case of the QUBO formulation, each Boolean variable (a$_i$) may be assigned a binary value of 0 or 1. Whereas, in case of the Ising formulation, each Boolean variable (a$_i$) may be assigned a binary value of +1 or −1 (representing one of the spin states of an Ising system).

At 322, an integral solution of QIP problem may be determined. The integral solution may be the optimal or near optimal solution of the received QIP problem. The integral solution may be determined by solving the substitution term for each integer variable ($x_i$) of the unknown integer vector (x) using the vector of binary values (included in received solution of the submitted QUBO formulation). For example, using equation (5), the substitution term for a first integer variable ($x_1$) may be given by $x_1=(1-a_1)\lfloor \tilde{x}_1 \rfloor + a_1 \lceil \tilde{x}_1 \rceil$. If the real value for $\tilde{x}_1$ is 3.4, then, $x_1=(1-a_1)\lfloor 3.4 \rfloor + a_1 \lceil 3.4 \rceil$, i.e. $(1-a_1)3+4(a_1)$ or $(3+a_1)$. If $a_1$ is determined as 0 from the received solution of the submitted QUBO formulation, then $x_1$ may be determined as 3. If $a_1$ is determined as 1 from the integral solution, then $x_1$ may be determined as 4. Thus, the integral range of the solution for $x_1$ is {3, 4}. The integral solution for $x_1$ of the QIP problem may include one of 3 (for $a_1=0$) or 4 (for $a_1=1$). From the foregoing example, it may be observed that the integral range of $x_1$ is small (i.e. 2). The accuracy of the integral solution may depend on the vector of real values $\tilde{x}$, obtained from the approximate solution to the relaxed QIP problem).

Figure 4:
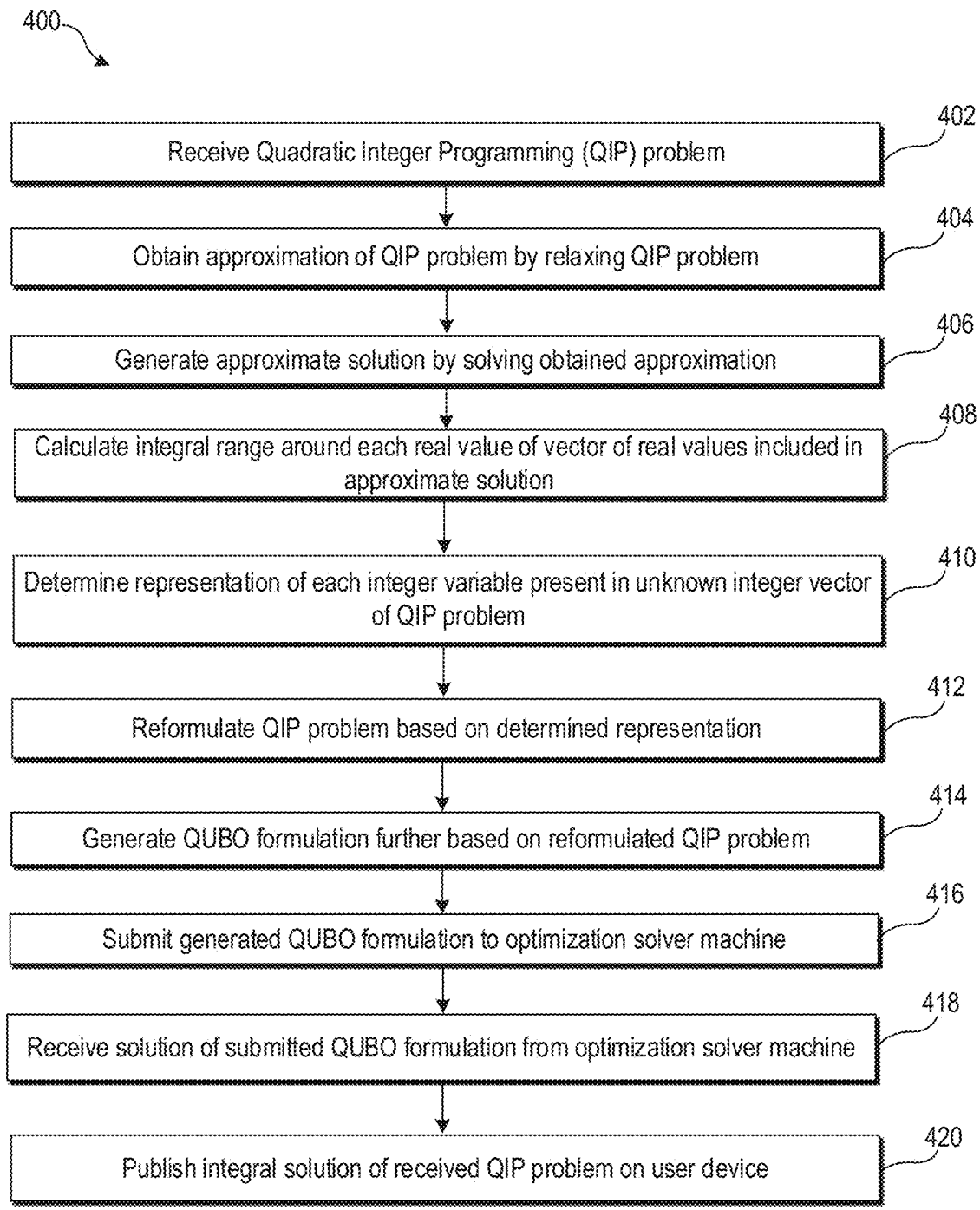
FIG. 4 is a flowchart of a second method for solving quadratic integer programming problems on optimization solver machines.

The first method described in FIG. 3 may suffer from few accuracy issues and therefore may be suitable for solving a QIP problem with few constraints on integer variables. For example, the relaxed problem, or the approximation of the QIP problem may be stuck in a local minimum instead of a global minimum. In such a case, the real values in the approximate solution may not be accurate and therefore, may affect accuracy of the integral solution. In some cases, the constraints may not be satisfied in the reformulated QIP problem for the Boolean variables. In some other cases, if the constraints are satisfied, the integral solution may not be an optimal solution of the QIP problem. In order to overcome limitations associated with the lower integral range and the accuracy, a second method of finding the integral solution of the QIP problem is described, for example, in FIG. 4. The second method of FIG. 4 is suitable for solving QIP problems with greater number of constraints on the integer variables. With the second method, there is an additional delay in the determination of the integral solution as compared to the first method due to an increase in the integral range for each integer variable.

At 324, the determined integral solution of the received QIP problem may be published on the electronic UI 106 user device 104. In one or more embodiments, the processor 202 may publish the determined integral solution of the received QIP problem on the user device 104.

Control may pass to end. Although the flowchart 300 is illustrated as discrete operations, such as 302, 304, 306, 308, 310, 312, 314, 316, 318, 320, 322, and 324; however, in certain embodiments, such discrete operations may be further divided into additional operations, combined into fewer operations, or eliminated, depending on the particular implementation.

FIG. 4 is a flowchart of a second method for solving quadratic integer programming problems on optimization solver machines, arranged in accordance with at least one embodiment described in the present disclosure. FIG. 4 is explained in conjunction with elements from FIG. 1, FIG. 2, and FIG. 3. With reference to FIG. 4, there is shown a flowchart 400. The second method illustrated in the flowchart 400 may start at 402 and may be performed by any suitable system, apparatus, or device, such as by the system 102 of FIG. 2.

At 402, a QIP problem may be received. The received QIP problem may include an objective function and a set of constraints on integer variables associated with the objective function. The objective function may be a quadratic function of integer variables, with linear constraints on the integer variables. Such constraints may be a linear equality and/or linear inequality constraints. Details about the QIP problem are provided, for example, at 302 of FIG. 3.

At 404, an approximation of the QIP problem may be obtained by relaxing the QIP problem. The relaxation of the QIP problem may include conversion of the received QIP problem (at 402) into a relaxed problem (also referred as an approximation of the QIP problem). Specifically, the relaxation may include replacement of the integer variables (x, $x \in Z^n$) with real variables ($x \in R^n$). Details about the approximation of the QIP problem is described at 304 of FIG. 3.

At 406, an approximate solution of the obtained approximation (i.e. the relaxed problem) may be generated by solving the obtained approximation. The approximate solution may include a vector of real values ($\tilde{x}$) corresponding to the unknown vector of variables (x) in the obtained approximation of the QIP problem. The vector of real values corresponding to the unknown vector of variables (x) may provide an optimal or near-optimal solution of the obtained approximation represented by equations (3) and (4).

At 408, an integral range may be calculated around each real value in the vector of real values ($\tilde{x}$) of the approximate solution. The integral range around each real value may include a lower bound and an upper bound. For a first real value of the vector of real values ($\tilde{x}$), the upper bound of the integral range may be calculated by application of a ceiling function on the first real value. In order to calculate the lower bound of the integral range, a linear programming (LP) problem may be formulated and solved. The LP problem may be formulated based on the objective function and the set of constraints on the integer variables ($x \in Z$) associated with the objective function of the received QIP problem.

The LP problem may be an optimization problem that may have a linear objective function, which may be subjected a set of linear equality or linear inequality constraints on real variables ($x \in R$, obtained after replacement of the integer variables). The objective of the LP problem may be to maximize or minimize the linear objective function. By way of example, and not limitation, the objective function of the LP problem may be by equation (7), as follows:

$$\min_{x} x_i \qquad (7)$$

Where,
x may represent an unknown vector of variables (i.e. the real variables) and $x \in R^n$. For equation (7), an inequality constraint may be provided by equation (8), as follows:

$$Ax \geq b$$

$$x \in R^n \qquad (8)$$

where,
A may represent a matrix of coefficients and $A \in R^{m \times n}$, and b may represent a known vector of coefficients.

The formulated LP problem may be solved to obtain a solution of the formulated LP problem. The formulated LP problem may be solved, for example, by software or hardware optimization solvers in a tractable amount of time. The solution of the formulated LP problem may provide the lower bound of the integral range.

In comparison to the first method of FIG. 3 where the upper bound is the ceiling value of a real value (in the approximate solution) and the lower bound is the floor value of the real value, the second method broadens the range around each integer variable ($x_i$) to overcome the limitations of the first method. By broadening the integral range of solution for each integer variable ($x_i$), the likelihood of finding a correct integral solution of the QIP problem increases. The broadened integral range may result in the optimization solver machine 108 incurring additional time for finding the correct integral solution for the QIP problem. and hence, the second method may consume more time as compared to the first method.

For example, if a real value ($\tilde{x}_1$) (from the approximate solution at 406) is 4.8, then the upper bound may be calculated as $\lceil 4.8 \rceil$ and the lower bound may be calculated as 2 by solving the LP problem. Thus, the integral range for $x_1$ may be {2, 3, 4}, which is broader than the integral range for $x_1$ using the first method of FIG. 3.

At 410, a representation of each integer variable present in the unknown integer vector of the QIP problem may be determined. Such a determination may be based on the calculated integral range. The determined representation of each integer variable may be a binary representation using one or more Boolean variables. By way of example, and not limitation, if the upper bound and the lower bound of the integral range for $x_1$ is 4 and 2, respectively, then $x_1$ may be represented as $2(1-a_1)+3(1-a_2)+4(1-a_3)$, where $a_1$, $a_2$, and $a_3$ are Boolean variables (as representatives of the integer variable $x_1$). Similarly, for other integer variables ($x_2 \ldots x_n$), similar representations using Boolean variables ($a_4, \ldots, a_n$) may be determined. All such Boolean variables may together form a vector of Boolean variables (a, where $a_i \in \{0,1\}$ or $\{-1,1\}$).

At 412, the QIP problem may be reformulated. The reformulation of the QIP problem may include a reformulation of the objective function of the QIP problem and the set of constraints associated with the objective function. The QIP problem may be reformulated based on the determined representation of each integer variable present in the unknown integer vector of the QIP problem. For example, each integer variable of the unknown integer vector (x) of the QIP problem may be substituted by the determined representation for the respective variable at 410. After the substitution, each integer variable of the reformulated QIP problem may include one or more Boolean variables (such as $a_1$, $a_2$, and $a_3$) as representative variables.

At 414, the QUBO formulation may be generated. The QUBO formulation may be generated based on the reformulated QIP problem. The QUBO formulation may be a compatible input format for the optimization solver machine 108 and may include a cost matrix of constants associated with a vector of Boolean variables (a). Details associated with the QUBO formulation are provided in detail, for example, in FIG. 3.

At 416, the generated QUBO formulation may be submitted to the optimization solver machine 108 via an API call to the optimization solver machine 108. In an embodiment, the optimization solver machine 108 may solve the QUBO formulation by application of searching methods and/or meta-heuristic methods, such as quantum annealing, to obtain a solution of the submitted QUBO formulation. Specifically, to search for the solution (i.e. values of the vector of binary decision variables (a)), the energy of the QUBO formulation may be minimized. The solution may be optimal (or near optimal) and may be searched from a discrete solution space. In another embodiment, the QUBO formulation (at 414) may be converted to an Ising formulation. In such a case, the Ising formulation may be submitted via the API call to the optimization solver machine 108.

At 418, the solution of the submitted QUBO formulation may be received from the optimization solver machine 108. The received solution may include a vector of binary values corresponding to the vector of Boolean variables (a) associated with the QUBO formulation. In case of the QUBO formulation, each Boolean variable ($a_i$) may be assigned a binary value of 0 or 1. Whereas, in case of the Ising formulation, each Boolean variable ($a_i$) may be assigned a binary value of +1 or -1 (representing one of the spin states of an Ising system).

At 420, an integral solution of the received QIP problem may be published on the user device 104. The integral solution may be based on the received solution (at 418). The received solution from the optimization solver machine 108 may contain Boolean values for each integer variable ($x_i$). For each integer variable ($x_i$), a respective integer value (of the integer solution) may be determined by substituting the Boolean values for the respective Boolean variables in the determined representation. For example, $x_1$ may be represented as $2(1-a_1)+3(1-a_2)+4(1-a_3)$. If $a_1=0$ and $a_2$, $a_3=1$ (determined from the received solution at 418), then $x_1$ may be calculated as 2 (1)+0+0, i.e. 2. Similarly, if $a_2=0$ and $a_1$, $a_3=1$, then $x_1$ may be calculated as 0+3 (1)+0, i.e. 3. Similarly, if $a_3=0$ and $a_1$, $a_2=1$, then $x_1$ may be calculated as 0+0+4(1), i.e. 4.

Control may pass to end. Although the flowchart 400 is illustrated as discrete operations, such as 402, 404, 406, 408, 410, 412, 414, 416, 418, and 420; however, in certain embodiments, such discrete operations may be further divided into additional operations, combined into fewer operations, or eliminated, depending on the particular implementation.

Figure 5:
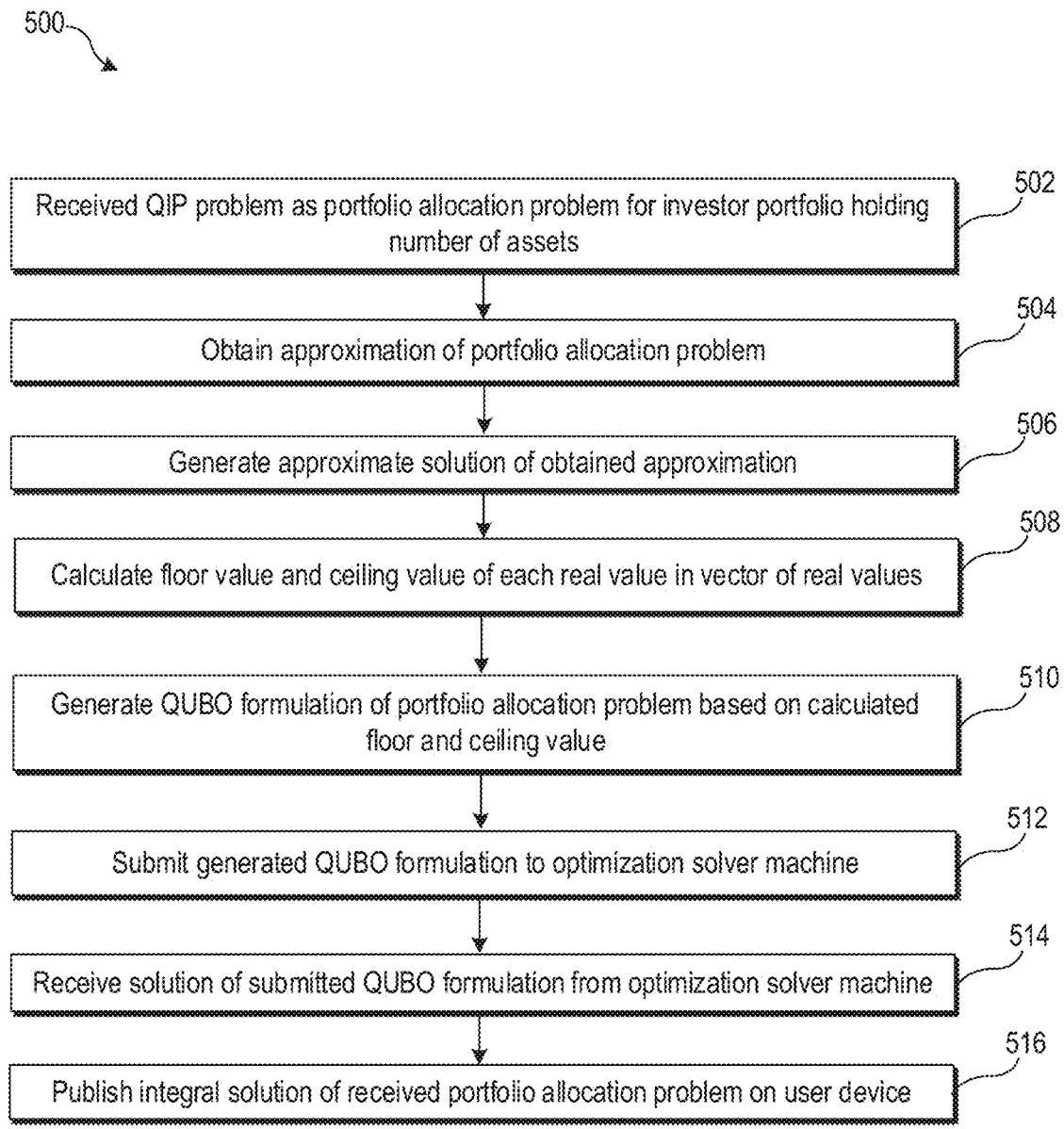
FIG. 5 is a flowchart of an example method for solving a portfolio allocation problem on optimization solver machines.

FIG. 5 is a flowchart of an example method for solving a portfolio allocation problem on optimization solver machines, arranged in accordance with at least one embodiment described in the present disclosure. FIG. 5 is explained in conjunction with elements from FIG. 1, FIG. 2, FIG. 3, and FIG. 4. With reference to FIG. 5, there is shown a flowchart 500. The example method illustrated in the flowchart 500 may start at 502 and may be performed by any suitable system, apparatus, or device, such as by the system 102 of FIG. 2.

At 502, a Quadratic Integer Programming (QIP) problem may be received. The received QIP problem may be a type of a portfolio allocation problem, such as a risk-averse portfolio allocation problem for an investor portfolio holding a number of assets. The objective of such a problem may be to determine a set-number of assets to be bought or sold for each asset type in the investor portfolio such that an investment risk associated with the investor portfolio is a minimum. The received QIP problem may include an objective function and a set of constraints on integer variables associated with the objective function. In some embodiments, parameters of the portfolio allocation problem may depend on financial time-series data. The financial time-series data may include datapoints (such as asset price per unit) for each asset type over a period of time. By way of example, and not limitation, the objective function of such a problem may be given by equation (9), as follows:

$$\min_{x} x^T Q x \quad (9)$$

Where,
Q may represent a square, positive definite matrix and $Q=P^T CP$,
Where,
P may represent a diagonal matrix with diagonal entries being the price of each asset, and C may represent a covariance matrix that may be calculated from the financial time-series data of each asset. and x may be an unknown integer vector, each integer variable of the unknown integer vector (x) may represent a number of assets bought or sold.

The objective function of equation (9) may be subjected to a constraint, as given by (10):

$$x \in Z^n \qquad (10)$$

In an embodiment, the system 102 may initialize a wealth vector (w). Each component of the wealth vector may be a price of a corresponding asset multiplied by a number of assets bought/sold. The wealth vector (w) may be utilized in finding the optimal or near-optimal solution of the portfolio allocation problem.

At 504, an approximation of the portfolio allocation problem may be obtained by relaxing the portfolio allocation problem. Such relaxation may include replacement of integer variables (i.e. the unknown integer vector, $x \in Z^n$) with real variables (i.e. an unknown vector, $x \in R^n$).

At 506, an approximate solution of the obtained approximation may be generated. The approximate solution of the obtained approximation may be generated by solving the obtained approximation. The approximate solution may include a vector of real values ($\tilde{x}$) corresponding to the unknown vector (x) representing a number of assets bought or sold. The approximate solution of the relaxed problem may help to determine, for each integer variable of the unknown integer vector (x, $x \in Z^n$), an integral range within which the value of the respective integer variable may lie.

At 508, a ceiling value and a floor value of each real value in the vector of real values ($\tilde{x}$) may be calculated. The ceiling value may be obtained after application of a ceiling function on a respective real value in the vector of real values ($\tilde{x}$). Similarly, the floor value may be obtained after application of a floor function on the respective real value in the vector of real values ($\tilde{x}$).

At 510, the QUBO formulation may be generated. Before generating the QUBO formulation, the objective function of equation (9) of the portfolio allocation problem may be reformulated by substituting each integer variable of the unknown integer vector (x) with a substitution term. An example of the substitution term is provided in FIG. 3. For each integer variable, the substitution term may be generated based on the floor value and the ceiling value (obtained at 508) and may represent the respective integer variable through one or more Boolean variables of a vector of Boolean variables. The QUBO formulation may be generated based on the reformulated objective function. Details associated with the generation of the QUBO formulation are described in detail, for example, in FIG. 3.

At 512, the generated QUBO formulation may be submitted to the optimization solver machine 108 via an API call. At 514, the solution of the submitted QUBO formulation may be received from the optimization solver machine 108. The received solution may include binary values of the vector of Boolean variables associated with the QUBO formulation.

At 516, the integral solution of the received portfolio allocation problem may be published on the user device 104. The integral solution of the portfolio allocation problem may be determined based on the received solution of the QUBO formulation. The published integral solution of the portfolio allocation problem may include the set-number of assets to be bought or sold for each asset type in the investor portfolio such that an investment risk associated with the investor portfolio is a minimum. Control may pass to end.

In some embodiments, the optimal solution or near-optimal solution of the (risk-averse) portfolio allocation problem may be represented by the smallest eigenvalue of the matrix (Q) of equation (9). The smallest eigenvalue of the matrix (Q) may be calculated by using a power method on $Q - \lambda_{max} 1$, where $\lambda_{max}$ may be the largest eigenvalue of the matrix (Q). The power method may also provide an eigen vector of the matrix (Q).

Although the flowchart 500 is illustrated as discrete operations, such as 502, 504, 506, 508, 510, 512, 514, and 516; however, in certain embodiments, such discrete operations may be further divided into additional operations, combined into fewer operations, or eliminated, depending on the particular implementation.

It should be noted that the method described in the FIG. 5 may be applicable on different variants of the portfolio allocation problem. For example, one of the variants of the portfolio allocation problem is return-targeted portfolio allocation problem. For such a problem, the objective is to determine a set-number of assets to be bought or sold for each asset type in the investor portfolio such that an investment risk subject to a certain targeted return ($\alpha$) is a minimum. Such problem may be considered as a convex optimization problem that may not have a closed form solution. The objective function of the return-targeted portfolio allocation problem is given by equation (11), as follows:

$$\min_{x} x^T Q x \qquad (11)$$

Where,

Q may represent a square, positive definite matrix of constants and $Q = P^T C P$, Where, P may be a diagonal matrix with diagonal entries being the price of each asset, and C may a covariance matrix that may be calculated from a financial time-series data of each asset, and x may represent an unknown integer vector representing a number of assets bought or sold for each asset type in the investor portfolio.

The objective function of equation (11) may be subjected to an inequality constraint on the unknown integer vector (x). The inequality constraint is given by equation (12):

$$r^T x \geq \alpha$$

$$x \in Z^n \qquad (12)$$

Where, r may represent a vector that may be formed by return and price of each asset, and $\alpha$ may represent a targeted return.

Figure 6:
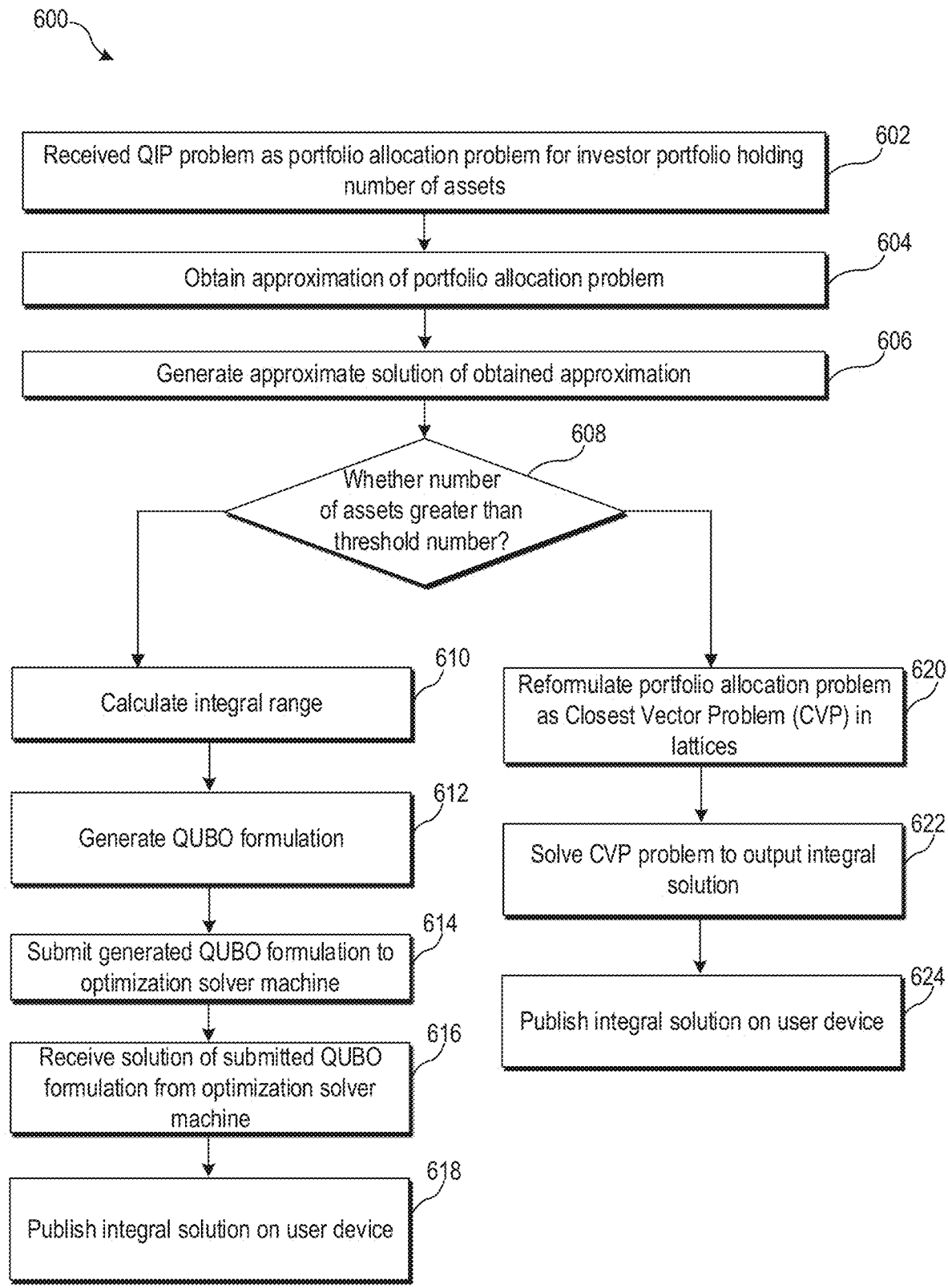
FIG. 6 is a flowchart of an example method for solving a portfolio allocation problem on optimization solver machines.

FIG. 6 is a flowchart of an example method for solving a portfolio allocation problem on optimization solver machines, arranged in accordance with at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The example method illustrated in the flowchart 600 may start at 602 and may be performed by any suitable system, apparatus, or device, such as by the system 102 of FIG. 2.

At 602, a QIP problem may be received. The received QIP problem may be another type of the portfolio allocation problem, such as a risk-versus-return portfolio allocation problem for an investor portfolio holding a number of assets. The objective of such a problem may be to determine a set-number of assets to be bought or sold for each type of asset in the investor portfolio such that an investment risk associated with the investor portfolio is a minimum and an investment return associated with the investor portfolio is a maximum.

The received QIP problem may include an objective function and a set of constraints on integer variables associated with the objective function. In some embodiments, parameters of the portfolio allocation problem may depend on financial time-series data. The financial time-series data may include datapoints (such as asset price per unit) for each asset type over a period of time. By way of example, and not limitation, the objective function of such a problem may be given by equation (13), as follows:

$$\min_{x} x^T Q x - r^T x \quad (13)$$

Where,
Q may represent a square, positive definite matrix of constants and $Q = P^T C P$,
Where,
P may be a diagonal matrix with diagonal entries being the price of each asset, and
C may a covariance matrix that may be calculated from a financial time-series data of each asset,
x may represent an unknown integer vector representing a number of assets bought or sold for each asset type in the investor portfolio, and
r may represent a vector that may be formed by return and price of each asset.
The objective function of equation (13) may be subjected to a constraint on the unknown integer vector (x). The constraint may be given by (14), as follows:

$$x \in Z^n \quad (14)$$

At 604, an approximation of the portfolio allocation problem may be obtained by relaxing the portfolio allocation problem. Such relaxation may include a replacement of integer variables (i.e. the unknown integer vector, $x \in Z^n$) with real variables (i.e. an unknown vector, $x \in R^n$).

At 606, an approximate solution of the obtained approximation may be generated. The approximate solution of the obtained approximation may be generated by solving the obtained approximation. The approximate solution may include a vector of real values ($\tilde{x}$) corresponding to the unknown vector (x) representing a number of assets bought or sold. The approximate solution of the relaxed problem may help to determine, for each integer variable of the unknown integer vector (x, $x \in Z^n$), an integral range within which the value of the respective integer variable may lie. In an embodiment, the relaxed problem may have a closed-form optimal solution that may be provided by equation (15), as follows:

$$x = Q^{-1} r \quad (15)$$

At 608, it may be determined whether the number of assets in the investor portfolio is greater than or equal to a threshold number. The threshold number may be a pre-defined number, such as 10. In some cases, the threshold number may be set to select an appropriate method of solving the risk-versus-return portfolio allocation problem. In case the number of assets is greater than the threshold number, control may pass to 610. Otherwise the control may pass to 620.

At 610, an integral range may be calculated around each real value in the vector of real values ($\tilde{x}$) of the approximate solution. The integral range around each real value may include a lower bound and an upper bound. Details associated with the calculation of the integral range are provided, for example, in FIG. 4 (at 408).

At 612, a QUBO formulation of the risk-versus-return portfolio allocation problem may be generated. After calculating the integral range, operations from 410 to 414 may be executed to generate the QUBO formulation for the risk-versus-return portfolio allocation problem (i.e. the received QIP problem).

At 614, the generated QUBO formulation may be submitted to the optimization solver machine 108 via an API call. At 616, the solution of the submitted QUBO formulation may be received from the optimization solver machine 108. The received solution may include binary values for a vector of Boolean variables associated with the submitted QUBO formulation. The vector of Boolean variables may be considered as representative variables for the integer variables (i.e. the unknown integer vector (x)).

At 618, the integral solution of the risk-versus-return portfolio allocation problem may be published on the user device 104. The integral solution may be determined based on the received solution of the submitted QUBO formulation. The published integral solution may specify the set-number of assets to be bought or sold for each type of asset in the investor portfolio such that an investment risk associated with the investor portfolio is minimum and an investment return associated with the investor portfolio is maximum. Control may pass to end At 620, the portfolio allocation problem may be reformulated as a Closest Vector Problem (CVP) in lattices. The CVP in lattices may be considered as a special type of lattice problem that may find a lattice point that may be closest to a target.

At 622, the CVP problem may be solved to output the integral solution of the portfolio allocation problem. The CVP problem may be solved on software/hardware solvers, or on the optimization solver machine 108. The solution of the CVP problem be used to produce the integral solution of the portfolio allocation problem. The integral solution of the portfolio allocation problem may include a set-number of assets to be bought or sold for each type of asset in the investor portfolio such that an investment risk associated with the investor portfolio is a minimum and an investment return associated with the investor portfolio is a maximum. In an embodiment, the CVP problem may be solved by finding the closest integer vector in $Z^n$ from x* ($x^* = Q^{-1} r$) in a metric that may be defined by $Q^{-1}$.

At 624, the integral solution may be published on the user device 104. Control may pass to end. Although the flowchart 600 is illustrated as discrete operations, such as 602, 604, 606, 608, 610, 612, 614, 616, 618, 620, 622, and 624; however, in certain embodiments, such discrete operations may be further divided into additional operations, combined into fewer operations, or eliminated, depending on the particular implementation.

Figure 7:
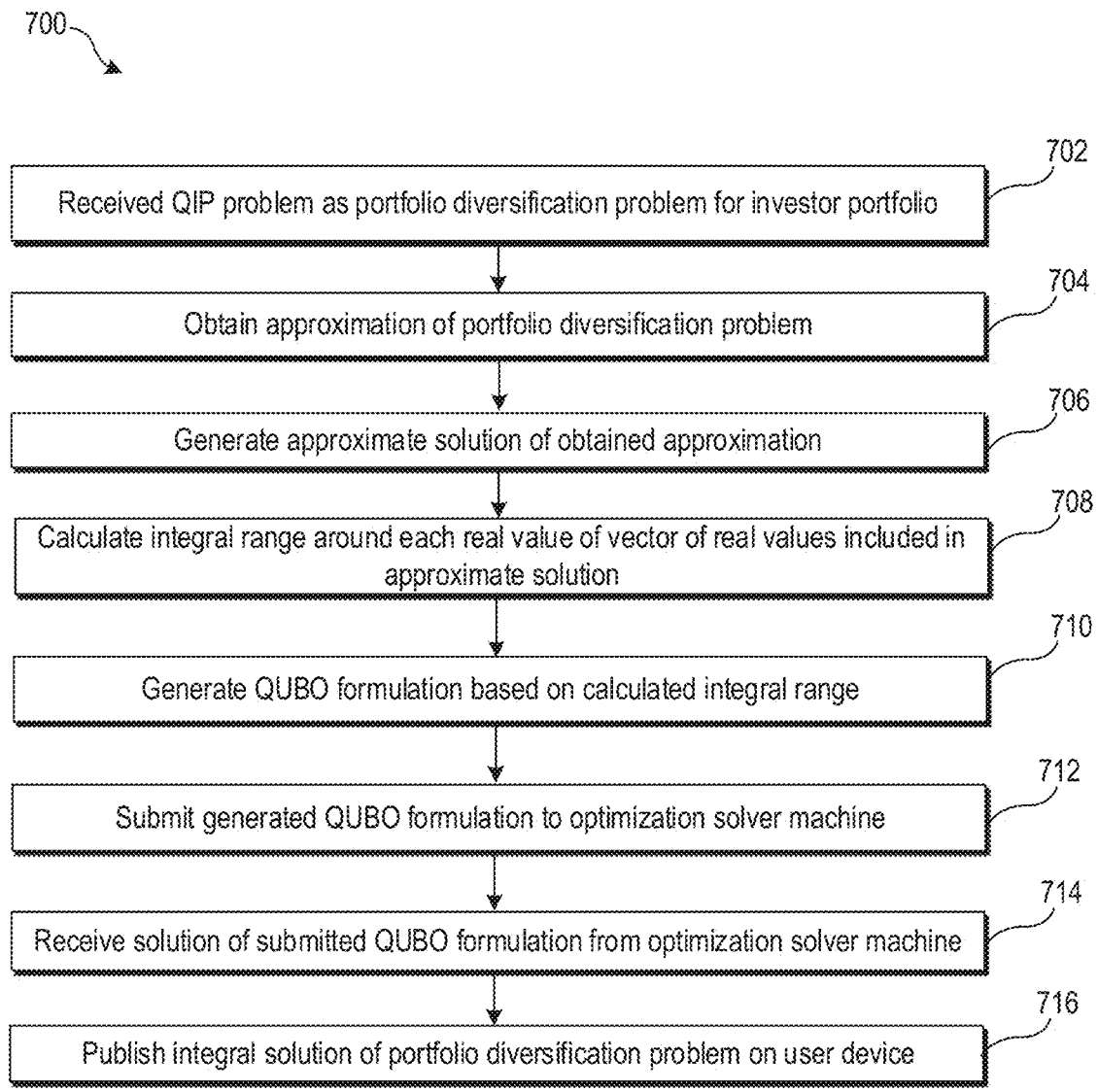
FIG. 7 is a flowchart of an example method for solving a portfolio diversification problem on optimization solver machines, all according to at least one embodiment described in the present disclosure.

FIG. 7 is a flowchart of an example method for solving a portfolio diversification problem on optimization solver machines, arranged in accordance with at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The example method illustrated in the flowchart 700 may start at 702 and may be performed by any suitable system, apparatus, or device, such as by the system 102 of FIG. 2.

At 702, a QIP problem may be received. The received QIP problem may be a portfolio diversification problem for an investor portfolio. The portfolio diversification problem may overcome issues associated with the portfolio allocation problem. Such issues may include, for example, a diversification issue arising when the portfolio allocation problem puts a lot of weight on few assets, an issue associated with an absence of parameters/constraints to model transaction costs associated with purchase and sale of the assets, and an issue with parameter estimation (such as small changes in parameters of the portfolio allocation problem may result in large changes in the optimal (or near-optimal) solution of the portfolio allocation problem).

The objective of the portfolio diversification problem for the investor portfolio (holding a number of assets) is to determine a set-number of assets to be bought or sold for each type of asset in the investor portfolio such that an investment risk associated with the investor portfolio is a minimum, an investment return associated with the investor portfolio is a maximum, and an exposure to any one type of asset in the investor portfolio is limited so that the investor may not face a loss in case a market value for a particular type of assets crashes. The portfolio diversification problem may include an objective function and a set of constraints on integer variables associated with the objective function. By way of example, and not limitation, the objective function of the portfolio allocation problem may be by equation (16), as follows:

$$\min_{x} x^T Q x - r^T x \quad (16)$$

Where,
Q may represent a square, positive definite matrix of constants and $Q = P^T C P$,
 Where,
 P may be a diagonal matrix with diagonal entries being the price of each asset, and
 C may a covariance matrix that may be calculated from a financial time-series data of each asset,
x may represent an unknown integer vector representing a number of assets bought or sold for each asset type in the investor portfolio, and
r may represent a vector that may be formed by return and price of each asset.

The objective function of equation (16) may be subjected to an inequality constraint on the unknown integer vector (x), as given by equation (17):

$$Ax \geq b$$

$$x \in Z^n \quad (17)$$

The constraint of equation (17) may model the portfolio diversification and transaction costs as well.

At 704, an approximation of the portfolio diversification problem may be obtained by relaxing the portfolio diversification problem. Such relaxation may include a replacement of integer variables (i.e. the unknown integer vector, $x \in Z^n$) with real variables (i.e. an unknown vector, $x \in R^n$).

At 706, an approximate solution of the obtained approximation may be generated. The approximate solution of the obtained approximation may be generated by solving the obtained approximation. The approximate solution may include a vector of real values ($\tilde{x}$) corresponding to the unknown vector (x) representing a number of assets bought or sold. The approximate solution of the relaxed problem may help to determine, for each integer variable of the unknown integer vector (x, $x \in Z^n$), an integral range within which the value of the respective integer variable may lie.

At 708, an integral range around each real value of the vector of real values ($\tilde{x}$) may be calculated. The integral range around each real value may include a lower bound and an upper bound. The upper bound of the integral range for a first real value of the vector of real values ($\tilde{x}$) may be calculated by application of the ceiling function on the first real value. To calculate the lower bound of the integral range, a linear programming (LP) problem may be formulated and solved (as described in FIG. 4, for example). Details associated with the calculation of the integral range are provided, for example, in FIG. 4 (at 408).

At 710, the QUBO formulation may be generated for the portfolio diversification problem. After calculating the integral range, operations from 410 to 414 may be executed to generate the QUBO formulation for the portfolio diversification problem. Details about generation of the QUBO formulation based on the calculated integral range is described, for example, in FIG. 4.

At 712, the generated QUBO formulation may be submitted to the optimization solver machine 108 via an API call. At 714, the solution of the submitted QUBO formulation may be received from the optimization solver machine 108. The received solution may include binary values for a vector of Boolean variables associated with the submitted QUBO formulation. The vector of Boolean variables may be considered as representative variables for the integer variables (i.e. the unknown integer vector (x)).

At 716, the integral solution of the received portfolio diversification problem may be published on the user device 104. The published integral solution of the portfolio diversification problem may include the set-number of assets to be bought or sold for each type of asset in the investor portfolio such that an investment risk associated with the investor portfolio is minimum, an investment return associated with the investor portfolio is maximum, and the exposure to any one type of asset in the investor portfolio is limited so that the investor may not face the loss in case the market value for the particular type of assets crashes.

Control may pass to end. Although the flowchart 700 is illustrated as discrete operations, such as 702, 704, 706, 708, 710, 712, 714, and 716; however, in certain embodiments, such discrete operations may be further divided into additional operations, combined into fewer operations, or eliminated, depending on the particular implementation.

In some embodiments, the received QIP problem may be a quadratic knapsack problem (QKP). The QKP may be similar to the knapsack problem but in the QKP, a quadratic function may be optimized. The constraint matrix (A) and constraint vector (b) of a constraint ($Ax \geq b$) on the integer vector (x) of the QKP may be non-negative. The optimal or near-optimal solution of the QKP may be used, for example, in designing email servers and optimizing the locations of "server nodes" and to position transportation hubs, such as airports and trains for optimal traffic flow in a city. In an exemplary case, the QKP may be solved using the second method of FIG. 4.

Although the present disclosure describes the solving quadratic integer programming problems on optimization solver machines, the present disclosure may also be applicable to an Ising formulation, which is a transformation of a QUBO formulation. Similar to the case of QUBO formulation, in case of the Ising formulation, the QIP problem may be reformulated and then the Ising formulation may be generated and submitted to an Ising solver on the optimization solver machine 108, based on the methods described in FIGS. 3, 4, 5, 6, and 7.

Various embodiments of the disclosure may provide a non-transitory computer-readable storage medium configured to store instructions that, in response to being executed, causes a system (such as the system 102) to perform operations that include receiving a Quadratic Integer Programming (QIP) problem including an objective function and a set of constraints on integer variables associated with the objective function. The operations may further include obtaining an approximation of the QIP problem by relaxing the QIP problem and generating an approximate solution by solving the obtained approximation. The operations may further include generating a Quadratic Unconstrained Binary Optimization (QUBO) formulation of the QIP problem based on the generated approximate solution and the received QIP problem. The operations may further include submitting the generated QUBO formulation to an optimization solver machine (such as the optimization solver machine 108) and receiving a solution of the submitted QUBO formulation from the optimization solver machine. The operations may further include publishing an integral solution of the received QIP problem on a user device (such as the user device 104) based on the received solution.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    receiving a Quadratic Integer Programming (QIP) problem comprising an objective function and a set of constraints on integer variables associated with the objective function, the received QIP problem is a portfolio allocation problem for an investor portfolio holding a number of assets;
    obtaining an approximation of the QIP problem by relaxing the QIP problem;
    generating an approximate solution by solving the obtained approximation;
    determining whether the number of assets is greater than a threshold number;
    reformulating the portfolio allocation problem as a Closest Vector Problem (CVP) in lattices when a determination is made that the number of assets in the investor portfolio is below the threshold number;
    solving the CVP problem to output an integral solution of the portfolio allocation problem;
    generating a Quadratic Unconstrained Binary Optimization (QUBO) formulation of the QIP problem based on the generated approximate solution and the received QIP problem when a determination is made that the number of assets in the investor portfolio is above the threshold number;
    submitting the generated QUBO formulation to an optimization solver machine;
    receiving, from the optimization solver machine, a solution of the submitted QUBO formulation; and
    publishing an integral solution of the received QIP problem on a user device based on the received solution, the integral solution of the portfolio allocation problem includes the set-number of assets to be bought or sold for each asset type in the investor portfolio such that an investment risk associated with the investor portfolio is reduced and an investment return associated with the investor portfolio is increased.

2. The method according to claim 1, wherein the relaxing the QIP problem comprises replacing the integer variables with real variables.

3. The method according to claim 1, wherein the approximate solution comprises vector of real values corresponding to an unknown vector of variables in the obtained approximation of the QIP problem.

4. The method according to claim 3, further comprising:
calculating a floor value of each real value in the vector of real values; and
calculating a ceiling value of each real value in the vector of real values.

5. The method according to claim 4, further comprising formulating a substitution term for each integer variable of an unknown integer vector of the QIP problem, wherein
the substitution term for each integer variable is formulated based on the calculated floor value and the calculated ceiling value of a corresponding real value in the vector of real values included in the approximate solution of the obtained approximation, and
the substitution term for each integer variable comprises one or more Boolean variables of a vector of Boolean variables.

6. The method according to claim 5, further comprising:
substituting each integer variable of the unknown integer vector of the QIP problem with the formulated substitution term;
reformulating the QIP problem based on the substitution; and
generating the QUBO formulation further based on the reformulated QIP problem, wherein the generated QUBO formulation comprises a cost matrix of constants associated with the vector of Boolean variables.

7. The method according to claim 6, wherein the received solution of the submitted QUBO formulation comprises of a vector of binary values corresponding to the vector of Boolean variables.

8. The method according to claim 7, further comprising:
determining the integral solution of the QIP problem by solving the substitution term for each integer variable of the unknown integer vector using the vector of binary values in the received solution; and
publishing the determined integral solution of the received QIP problem.

9. The method according to claim 1, further comprising calculating an integral range around each real value of a vector of real values included in the approximate solution, wherein the vector of real values corresponds to an unknown vector of variables in the obtained approximation of the QIP problem.

10. The method according to claim 9, further comprising determining an upper bound of the integral range by applying a ceiling function on a corresponding real value in the vector of real values.

11. The method according to claim 9, further comprising:
formulating a linear programming (LP) problem based on the received QIP problem; and
determining a lower bound of the integral range based on a solution obtained by solving the formulated LP problem.

12. The method according to claim 9, further comprising:
determining, based on the calculated integral range, a representation of each integer variable present in an unknown integer vector of the QIP problem,
wherein the determined representation of each integer variable is a binary representation using one or more Boolean variables;
reformulating the QIP problem based on the determined representation of each integer variable present in the unknown integer vector of the QIP problem; and
generating the QUBO formulation further based on the reformulated QIP problem.

13. The method according to claim 1, wherein
the received QIP problem is a portfolio diversification problem for an investor portfolio, and
the portfolio diversification problem comprises a constraint function which models portfolio diversification and transaction costs for buying and selling of a number of assets maintained in the investor portfolio.

14. The method according to claim 1, wherein the received QIP problem is a quadratic knapsack problem (QKP).

15. A non-transitory computer-readable storage medium configured to store instructions that, in response to being executed, cause a system to perform operations, the operations comprising:
receiving a Quadratic Integer Programming (QIP) problem comprising an objective function and a set of constraints on integer variables associated with the objective function, the received QIP problem is a portfolio allocation problem for an investor portfolio holding a number of assets;
obtaining an approximation of the QIP problem by relaxing the QIP problem;
generating an approximate solution by solving the obtained approximation;
determining whether the number of assets is greater than a threshold number;
reformulating the portfolio allocation problem as a Closest Vector Problem (CVP) in lattices when a determination is made that the number of assets in the investor portfolio is below the threshold number;
solving the CVP problem to output an integral solution of the portfolio allocation problem;
generating a Quadratic Unconstrained Binary Optimization (QUBO) formulation of the QIP problem based on the generated approximate solution and the received QIP problem when a determination is made that the number of assets in the investor portfolio is above the threshold number;
submitting the generated QUBO formulation to an optimization solver machine;
receiving, from the optimization solver machine, a solution of the submitted QUBO formulation; and
publishing an integral solution of the received QIP problem on a user device based on the received solution, the integral solution of the portfolio allocation problem includes the set-number of assets to be bought or sold for each asset type in the investor portfolio such that an investment risk associated with the investor portfolio is reduced and an investment return associated with the investor portfolio is increased.

16. A system, comprising:
a processor configured to:
receive a Quadratic Integer Programming (QIP) problem comprising an objective function and a set of constraints on integer variables associated with the objective function, the received QIP problem is a portfolio allocation problem for an investor portfolio holding a number of assets;

obtain an approximation of the QIP problem by relaxing the QIP problem;

generate an approximate solution by solving the obtained approximation;

determine whether the number of assets is greater than a threshold number;

reformulate the portfolio allocation problem as a Closest Vector Problem (CVP) in lattices when a determination is made that the number of assets in the investor portfolio is below the threshold number;

solve the CVP problem to output an integral solution of the portfolio allocation problem;

generate a Quadratic Unconstrained Binary Optimization (QUBO) formulation of the QIP problem based on the generated approximate solution and the received QIP problem when a determination is made that the number of assets in the investor portfolio is above the threshold number;

submit the generated QUBO formulation to an optimization solver machine;

receive, from the optimization solver machine, a solution of the submitted QUBO formulation; and publish an integral solution of the received QIP problem on a user device based on the received solution, the integral solution of the portfolio allocation problem includes the set-number of assets to be bought or sold for each asset type in the investor portfolio such that an investment risk associated with the investor portfolio is reduced and an investment return associated with the investor portfolio is increased.

* * * * *